INVENTORS
R. A. SANFORD
B. O. AYERS
BY
Young & Quigg
ATTORNEYS 3,457,704
CHROMATOGRAPHIC METHOD AND APPARATUS
Richard A. Sanford and Buell O. Ayers, Bartlesville, Okla., assignors to Phillips Petroleum Company, a corporation of Delaware
Filed Oct. 10, 1966, Ser. No. 585,375
Int. Cl. B01d *15/08*
U.S. Cl. 55—67                    7 Claims

ABSTRACT OF THE DISCLOSURE

A chromatographic separation column and a gas sensitive detector connected in series are operated in a cycle by (1) passing a sample gas containing trace amounts of molecular substances to be detected through said column for at least five minutes to equilibrate said column, (2) then passing a displacer gas into said column toward said detector to displace and concentrate said trace components, (3) passing a carrier gas through said column in the same direction to elute said trace components through said detector, (4) detecting said trace components, and (5) repeating the cycle.

DISCLOSURE

Figure 1:
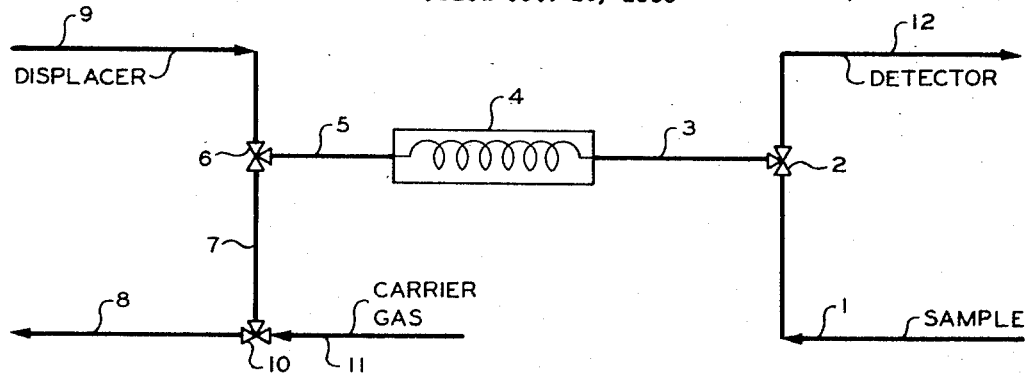

This invention relates to concentration chromatography. In another aspect this invention relates to a novel method and apparatus for concentrating trace components in a fluid sample with a chromatographic separation column so that they might be subsequently analyzed. In another aspect, this invention relates to a novel method and apparatus for controlling the rate of elution of components through chromatographic separation column.

Conventional fluid mixture component separations can be accomplished by passing a measured slug of sample fluid mixture through a column containing a body of sorptive material. In elution chromatography, the sample fluid mixture is normally carried through a column by means of a carrier gas stream. During this process, an equilibrium between sample in the moving and stationary phases will be established, and the sample components in the moving phase will thereby be eluted or "pulled" through the column. In displacement chromatography, a displacer gas displaces sorbed sample components from the sorbent material and "pushes" the components through the column. In frontal development chromatography, a continuous stream of gas containing sample components is passed through a column and components within the gas stream then separate according to their sorption coefficients and form concentration fronts and elute from the column generally in the reverse order of the components' affinity for the sorptive material. This invention is concerned with both displacement and elution chromatography and other aspects of adsorption chromatography.

The actual separation of a trace component in a sample from a sample gas is accomplished by selective sorption of components by the column material. Each component in a fluid sample has its own "affinity" for a given column material. Because of this "affinity," different components will move through the column at different rates under the influence of a carrier gas driving force. Under the same conditions of temperature, flow rate, pressure, carrier gas, column length and column condition, any one component will have the same retention time for repeated runs through the column. Eventually all the components in a gas sample will be moved through the column and the time that each emerges from the column can be determined experimentally. As each component emerges from the column, a detector device such as thermistors in a Wheatstone bridge may be used to measure its magnitude. The output of the detector is in peak curve form, wherein each peak may represent one component and the quantity of each of the components is represented by the area under its respective curve. Existing chromatographic procedures can make determinations down to 50 to 100 parts per million of components in gas samples. These procedures may also be combined with ionization detectors to improve sensitivity by $10^3$ in some cases. However, ionization detectors are very complicated and require more attention in maintenance and for that reason they are generally avoided. Additionally, ionization detectors are not sensitive to certain materials. For example, the hydrogen flame ionization detector is not sensitive to some gases such as Freon and helium. By using the present invention, determination on some components may be made to 100 parts per billion with a conventional thermistor detector, and 100 parts per trillion with the ionization detector.

As has been stated, the rate that a constituent will travel through the column will depend upon its affinity for the column packing material. Therefore, components that have a very high affinity for the packing material will have a very long retention time and a long elution time. When components of high affinity are combined in a single sample with components of low affinity, there is no single set of operating conditions which is optimum for all the components. Optimum conditions may be approached by programmed heating of the column and thereby speeding up the analysis, but this variable heating operation is complicated and difficult to control. The present invention provides a way to speed these components through a column without the necessity of the heating operation.

One object of this invention is to provide an improved method for analyzing fluid streams. Another object of this invention is to provide a method of concentrating and analyzing trace components from a very large fluid sample by first utilizing a displacer gas to concentrate the sorbed trace components and subsequently utilizing a carrier gas to elute the resulting concentrated components through the column to the analyzer. Still another object of this invention is to provide a novel method of controlling the rate of elution of components with long retention times through the column. A further object of this invention is to provide a new and improved chromatographic apparatus to analyze fluid streams containing trace components. Still a further object of this invention is to provide a new and improved apparatus for controlling the rate of elution of components through a chromatographic separation column.

According to one aspect of the invention, trace amounts of components to be analyzed are first concentrated in a chromatographic separation column. It has been found many times that components to be analyzed are present in the sample fluid in such minute amounts that when a normal sample of a few cc.'s is used there is not a sufficient amount of trace components to allow detection using the conventional methods of separation and analysis, because the analyzers are not sensitive enough to detect these trace components. Therefore, according to one aspect of the invention, either a very large sample from a very large sample loop is forced into a column or a sample gas is run through the column at a reproducible rate for a reproducible time. When this is done with a sample gas that is less strongly sorbed in the column than the trace components, a relatively large amount of trace component or components are sorbed in the column. Then a displacer gas that is more strongly sorbed on the column than the trace components is directed either into the same or the opposite end of the column and displaces or desorbs these trace components into the moving phase from the stationary phase. This sorption of the displacer gas makes the stationary phase unsorptive to the trace components; therefore, these desorbed components are displaced ahead of the displacer gas. This causes the desorbed components to become concentrated in a narrow band in the displacer gas interface. The displacer gas generally can be any gas that is more strongly sorbed in the column than the sample components and the carrier gas. For example, ethylene or propylene is more strongly sorbed in a column than $H_2$, $O_2$, $N_2$ or Ne. Therefore, when analyzing trace amounts of $H_2$, $O_2$, $N_2$ or Ne in a helium stream, for example, ethylene or propylene can be used as the displacer gas in this invention. As stated, the trace components are concentrated in the front of the displacer gas as the displacer gas moves on the column. This results in the column being deactivated by the displacer gas in a zone near the end of the column from which the displacer gas was introduced. After the displacer gas has passed into the concentration zone, a carrier gas is passed through the column from the same end that the displacer gas entered. The carrier gas is less strongly sorbed in the column than the displacer gas, and will, therefore, move through the deactivated zone without moving or desorbing the sorbed displacer gas very far, as it then elutes the concentrated components into the sensing device. A flushing gas can then be passed through the column to erode all contaminates from the sorbent until a desired level of reactivation is reached. However, it is preferred that the sample gas be used as flushing gas. When used in this manner, the desired amount of displacer can be eroded or purged from the column by the sample gas, as the sample components are equilibrated on the column to initiate a new analyzer cycle. Reproducible results can be obtained by adding the same amount of sample during the flushing or eroding operation or step and then desorbing sample components in a zone near the displacer gas inlet by the same amount of displacer gas.

Also, when the trace component concentrations are very low, the same gas may be utilized as sample, carrier and flushing gas. For example, helium sample gas with trace amounts of hydrogen, oxygen and nitrogen was used successfully as a carrier gas when a concentration of the trace components was within the range of 1 p.p.m. or greater. The helium was also used to flush a displacer gas of ethylene from the column, and this flushing operation served also to equilibrate the column with the helium sample.

Another embodiment of this invention involves the use of variable flow devices to control the speed of components through the column. This embodiment is used when components have widely different retention times. It has been found that once the elution step has begun, if the flow of the carrier gas is slowly decreased and the flow of a displacer gas which is sorbed on the column is slowly increased, then the gradual increase in the vapor concentration of the displacer gas will have the effect of deactivating the column and the sample components are now eluted at gradually increasing rates and the moving of components with very high retention times through the column occurs at an increased rate. Thus, chromatography operation time for detecting heavy hydrocarbons can be reduced by utilizing this variable flow method. For example, in a gas stream containing amounts of butane, pentane, and octane, it was found that when a displacer gas, ethylene, was programmed with helium as carrier gas, the elution time for octane was substantially decreased.

Figure 2:
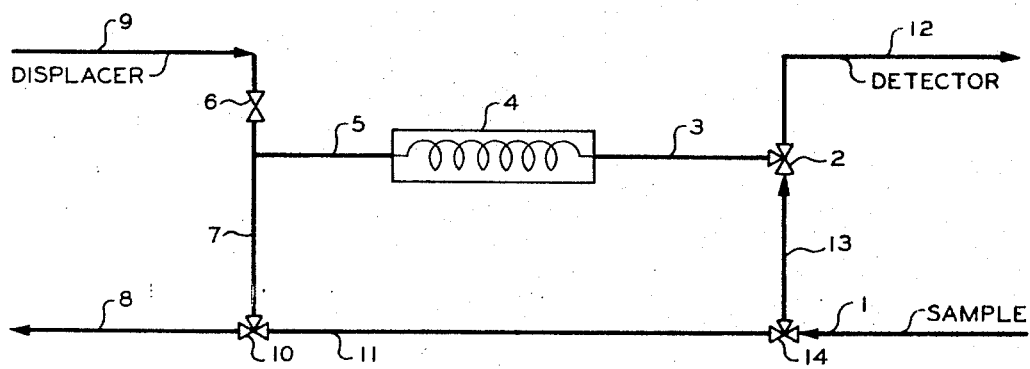
Figure 3:
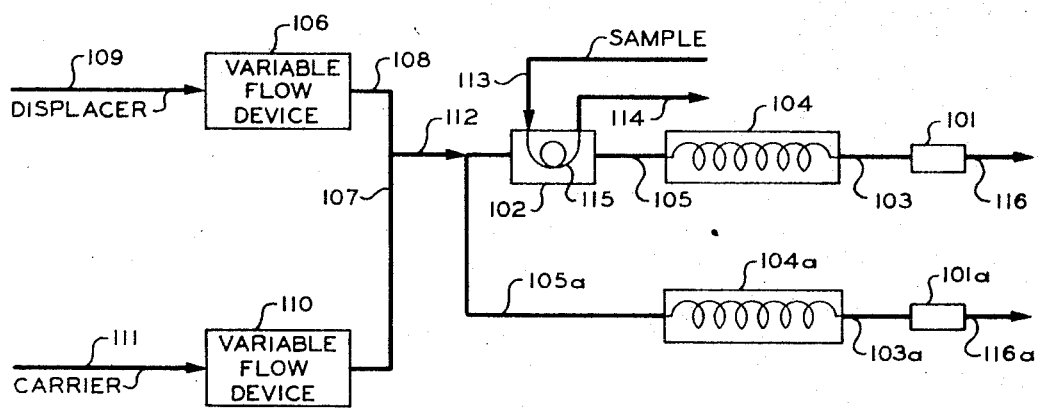

Further explanation of this invention will be made by referring to the drawings of which FIGURE 1 is a schematic diagram of one embodiment of the apparatus of this invention in which the process of the invention can be carried out, and FIGURE 2 is another embodiment of the apparatus of this invention in which the process of this invention can be carried out when the same gas is used as sample gas, carrier gas, and backflushing gas. FIGURE 3 is an apparatus with two variable flow devices for controlling the flow of the carrier stream which in turn controls the rate of elution of components through a chromatographic separation column.

Referring to FIGURE 1 in detail, column 4 is a column usually from 5 to 20 feet long filled with packing material. A gas sample to be analyzed coming either from a very large sample loop or merely run through column 4 at a reproducible rate for a reproducible time, normally from 100 to 500 cc. per minute for several minutes, is introduced through conduit 1. Conduit 1 communicates with a valve 2 and when valve 2 is in a first position, conduit 1 communicates with conduit 3 which in turn communicates with column 4 which in turn communicates with conduit 5 and valve 6. When valve 6 is in a first position, conduit 5 communicates with conduit 7 which in turn communicates with valve 10 and when valve 10 is in a first position, conduit 7 communicates with vent line 8.

A displacer gas is then introduced through conduit 9 which communicates with valve 6, and when valve 6 is in a second position conduit 9 communicates with conduit 5 which in turn communicates with column 4. Column 4 communicates with conduit 3 which in turn communicates with valve 2, and when valve 2 is in a second position conduit 3 communicates with conduit 12 which in turn communicates with a detector.

A carrier gas is introduced through conduit 11 which in turn communicates with valve 10, and when valve 10 is in a second position conduit 11 communicates with conduit 7. Conduit 7 communicates with conduit 5 when valve 6 is in its first position and conduit 5 communicates with column 4 which in turn communicates with conduit 3. Conduit 3 communicates with conduit 12 when valve 2 is in its second position, and conduit 12 communicates with a detector.

Valves 2, 6, and 10 are operated in sequence either manually or by the use of a timer (not shown). These valves can be solenoid operated so that the valves are in second positions when the associated solenoids are energized and are in first positions when the solenoids are deenergized. A timer can comprise a series of cam operated switches which supply energizing current to the solenoids of the valves.

In order to describe the operation of the analyzer of this invention, reference will be made to a typical detection of nitrogen and oxygen impurities in a helium stream. The sample stream comprises helium having a purity greater than 99 percent. The nitrogen and oxygen impurities which are present are in a concentration as low as 100 parts per billion. Column 4 is approximately 10 feet in length and has an internal diameter of approximately 0.2 inch. The column is filled with a molecular sieve material (Linde). This material is generally in the form of granules. The helium sample gas is introduced into conduit 1 at the rate of from 50 to 500 cc. per minute for several minutes and distributes trace components into the sorbent material. The valves are so positioned that the sample gas flows through conduits 1, 3 through column 4, conduit 5, conduit 7, and through vent 8. Ethylene, which is used as the displacer gas, is then introduced through conduit 9 after valve 6 is placed in its second position and displaces the sorbed trace components from the sorbent material. This causes the components to become concentrated in a narrow band in the displacer gas interface. The displacer gas volume introduced is 500 cubic centimeters at 2 atmospheres. After the displacer gas is introduced, valve 10 is positioned to its second position, valve 6 is placed in its first position and carrier gas at the rate of about 50 cc. per minute is introduced through conduit 11. The carrier gas flows through conduit 11, conduit 7, conduit 5, column 4, conduit 3, and conduit 12 to a thermistor detector. The carrier during this flow operation elutes the concentrated trace components through column 4. The elution time for the nitrogen and oxygen varies with the temperature of the column and will be from about 2 to 4 minutes at 75° F. and from about 1 to 2 minutes at 120° F. This chromatographic method can also be carried out on a modified apparatus of FIGURE 1 wherein sample is introduced into the same end of the column as the displacer and carrier gas streams. When using this modified apparatus, and the sample gas is used to forward flush the displacer, it will be necessary to add a heating means (not shown) to the column. This heating means is necessary to heat the column and speed the desorption of the displacer through the length of the column to thereby shorten the analysis cycle. A relatively short back-flushing time is achieved when the flushing gas is introduced from the detector end of the column, but a long forward flushing time is achieved when the flushing gas is introduced from the end of the column near the deactivated displacer zone. The addition of heat to the column in the latter instance will therefore speed the travel of displacer through the column during a front-flushing process. This can be done by removing 3-way valve 2 and connecting conduit 3 with conduit 12 and either replacing 3-way valve 6 with a 4-way valve, one opening of which is operatively connected to conduit 1, or by connecting a valve means with conduit 1 attached, on to conduit 5. The sample, displacer, and carrier gas streams will flow in the same sequence as they did in the apparatus of FIGURE 1.

FIGURE 2 is an embodiment of the invention which is an apparatus that utilizes a sample gas also for carrier gas and back-flushing gas. The sample gas serves as carrier gas when valves 14, 2 and 10 are in their first position which will allow flow through conduits 1, 11, 7 and 5, column 4, conduit 3, valve 2, conduit 12 to the detector. When valves 14, 2 and 10 are in their second position, a sample gas will flow through conduits 1, 13, 3, column 4, conduits 5, 7 and out vent 8. When used in this manner, the sample gas may be used as sample and back-flushing gas. To better describe the operation of this embodiment, reference will be made to the detection of a helium sample containing 0–50 p.p.m. total impurities such as $O_2$, $N_2$, A and $CH_4$. The helium sample first flows by route 13, 2, 3, 4, 5, 7, 10, 8 at the rate of 200 cc. per minute for 5 minutes to back-flush displacer from a prior run and to adsorb impurities from the helium sample for the next analysis. After the helium flow is cut off, valve 6 is opened and ethylene displacer gas flows through conduits 9 and 5, and into column 4 until a total of 500 cc. is thereby passed into said column 4. Next, valves 14, 10 and 2 are switched to allow the helium to flow by route 11, 10, 7, 5, 4, 3, 2, 12 at 50–100 cc. per minute until the impurity peaks are eluted and detected. The peaks should be eluted in 2–3 minutes.

FIGURE 3 is a schematic illustration of one embodiment of this invention which utilizes variable flow devices to control the speed of components through the column. Now referring to FIGURE 3, conduit 109 is operatively connected to variable flow device 106 and is used for introducing displacer gas into the apparatus. In the embodiment of FIGURE 3, displacer gas refers to a strongly sorbed gas which is used to modify the capacity of the sorbent material. Conduit 111 is operatively connected to variable flow device 110 and is used for introducing carrier gas into the apparatus. Conduit 108 is operatively connected between variable flow device 106 and common conduit 107 which in turn is operatively connected to variable flow device 110. Conduit 112 is operatively connected between common conduit 107 and sample valve 102. Conduit 105a is operatively connected between conduit 112 and chromatographic column 104a, and conduit 103a is operatively connected between chromatographic column 104a and reference detector 101a. Sample inlet valve conduit 113 and sample exit conduit 114 are operatively connected to sample valve 102. Sample loop 115 is operatively connected to sample valve 102. Conduit 105 is operatively connected between sample valve 102 and chromatographic column 104 and conduit 103 is operatively connected between chromatographic column 104 and sensing detector 101. Vent conduits 116 and 116a are operatively connected to detectors 101 and 101a, respectively. Sensing detector 101 and reference detector 101a can be thermistor members of an ordinary Wheatstone bridge operatively connected in any suitable manner known in the art. Reference column 104a is identical with sample column 104 and is subject to the same carrier and displacer gas variations as the said sample column. Its use will compensate for the variation of displacer concentration at the detector by balancing the detector circuit so that the sample component peaks can be more readily ascertained.

In FIGURE 3, when the sample components are being eluted from column 104 through detector 101, the eluting gas starts out as 100% carrier gas from line 111 and 0% displacer gas from line 109, but variable flow devices 106 and 110 gradualy change this to 0% carrier gas and 100% displacer gas. If detector 101 is of a type that is sensitive to a different degree to the carrier gas than to the displacer gas, then this variation in composition should be compensated for by running this varying composition in the absence of the sample through a reference column 104a identical to column 104 and through a detector 101a identical to detector 101 and compensating the readings of detector 101 to remove the changes in its output signal caused by the varying composition of carrier and displacer gas detected by detector 101a. In such cases where the detector 101 is insensitive to changes in carrier and displacer gas composition, obviously parts 101a, 103a, 104a, 105a and 116a can be omitted.

To better explain the operation of this embodiment, the columns 104 and 104a are initially deactivated at the beginning of each analysis step by the strongly sorbed displacer used in the previous run. Variable flow device 106 then shuts off the flow of displacer gas from conduit 109, and variable flow device 110 is opened so that pure carrier gas flows through conduits 111, 107, 112, 105a, sample valve 102 and conduit 105, to establish the desired sorbed displacer gas profile for the next run in chromatographic columns 104 and 104a by partially forward flushing the said columns. The resulting concentration profile of displacer concentration in the said columns will be high at the column outlets and relatively low at the column inlets and of gradually varying concentration therebetween. At this time, sample gas is flowing through conduit 113, sample loop 115, and out conduit 114. The flushing operation will be done on a programmed condition so that when a sample is introduced into column 104, the column reactivation will be at a reproducible and useful level for the least strongly sorbed components of interest in the sample. Next, the sample valve is switched so that the carrier pushes the sample into column 104 and initiates the elution of components through said column 104 to the detector. At a desired programmed time after start of elution, the variable flow device 106 will gradually increase the concentration of the displaced by allowing displacer flow through conduits 108 and 107 and into conduit 112, and at the same time, variable flow device 110 decreases the flow rate of the non-absorbed carrier gas. The gradual increase in vapor concentration of the displaced gas in column 104 will have the effect of deactivating the inlet portion, and gradually the entire column, so that the more strongly sorbed sample components are now less strongly sorbed and therefore elute down the column at a gradually increasing rate. After the desired components are eluted, the column is brought to a reproducible rate of deactivation by continuing the flow of high displacer concentration gas through the column until the column is equilibrated. At this time, sample valve 102 is switched back to the original position so that sample will flow through conduit 113, sample loop 115 and out conduit 114, and the flushing operation with the carrier gas will be repeated.

In order to describe further the operation of this embodiment, reference will be made to a typical detection of a sample containing equal portions of butane, pentane and octane. The columns are aproximately 5 feet in length and have an internal diameter of approximately 0.2 inch. Each column is filled with molecular sieve material produced by Linde and is maintained at 120–140° F. during the analysis. Ethylene is used as displacer gas and helium is used as carrier. Variable flow devices 106 and 110 may be any type variable flow device used in the art that will vary the flow of fluid therethrough. The richest ethylene mixture that is to be used is first introduced into the columns by variable flow device 106. After the ethylene has run for 3–5 minutes and the columns are deactivated, variable flow device 106 shuts off the ethylene flow, and variable flow device 110 opens so that helium will flow through the columns at about 50 cc. per minute and will thereby activate the columns by purging some, or all, of the adsorbed ethylene. Sample valve 102 is then positioned so that the helium pushes a .1 to .5 cc. sample into column 104. The butane will elute through the column 104 in approximately 1 minute. After the butane peak is eluted partially, variable flow device 106 is activated to allow ethylene to gradually flow into the carrier gas stream, and variable flow device 110 gradually decreases the helium flow. This proportional flow continues for 5–10 minutes and variable flow device 106 continues to increase the flow of ethylene to about 50 cc. per minute until the maximum desired ethylene concentration has been achieved. The pentane will elute through the column in 1½ minutes, and the octane will elute through the column in 3 minutes.

As explained above, for example, in the second paragraph of the "Disclosure," the term "chromatographic column" obviously includes a stationary body of sorptive material. As is well known in the art, this sorptive material can be one or more solids, or one or more liquids, or one or more liquids supported on one or more solids. To be a chromatographic column, the column must be most sorptive to the displacer gas, intermediately sorptive to the various sample gases, and least sorptive to the carrier gas. Obviously, any one of these three classes of gases can be largely replaced by any other of these gases, if enough of the later is blown through the column for a long enough period of time, and in a shorter length of time if the column is heated, as is common practice in the prior art. Equilibrating a chromatographic column is done by passing one of these classes of gases through the column at a rate and for a time sufficient so that the gas emerging from the column is of substantially the same composition as that entering the column, and this can be done in 5 minutes.

This improved chromatography process and apparatus may be utilized in determining trace components in fluid streams at concentrations of 100 parts per billion utilizing a thermistor detector, and 100 parts per trillion utilizing an ionization detector. This process and apparatus can be used in various operations including the determination of hydrocarbons in gaseous streams, in air pollution work, in determining trace impurities such as hydrogen, oxygen or nitrogen in helium streams, in determination of hydrocarbons in water, and in various other operations for determining trace amounts of impurities in fluid streams.

The variable elution method of and apparatus for this invention can be used to speed up the analysis of heavy hydrocarbons in fluid streams without the necessity of utilizing a programmed temperature device for heating the chromatographic column.

We claim:

1. A method of analyzing trace amounts of components in a gaseous stream comprising:
    (a) equilibrating a column by passing a gas sample containing trace amounts of components to be analyzed into a chromatographic separation column for at least 5 minutes;
    (b) passing an inert displacer gas into the column which is more strongly sorbed in the column than the sample gas and the sample components to be analyzed, and thereby moving the sorbed trace components toward the opposite end of said column, causing said trace components to become concentrated while so moving;
    (c) passing an inert carrier gas which is less strongly sorbed in the column than the trace components and the displacer gas into said column and thereby eluting said concentrated trace components to a detector; and
    (d) detecting said trace components by said detector.

2. The method of claim 1 in which the carrier gas emploved is merely more of the sample gas.

3. The method of claim 2 wherein the sample gas is introduced into the end of the column adjacent the detector when (a) equilibrating the column, and into the end of the column opposite the detector when (c) acting as the carrier gas eluting said concentrated trace components to the detector.

4. The method of claim 1 wherein the said sample gas is introduced into one end of said column, and said displacer gas is introduced into the opposite end of said column than the said sample gas, and said carrier gas is introduced into the same end of said column as said displacer gas.

5. A method of controlling the rate of elution of sample components through a chromatographic column comprising: introducing an inert carrier gas stream into a chromatographic column; introducing a sample containing sample components more strongly sorbed in the column than said carrier gas into said carrier gas, and thereby sorbing the said sample in said chromatographic column; and slowly increasing the flow into the same end of the column of an inert displacer gas that is more strongly sorbed in the column than the carrier gas and the sample and its sample components in said column from 0% to 100% while slowly decreasing the flow of said carrier gas from 100% to 0% through said column to thereby cause said sample components to elute through the column at controlled rates.

6. An apparatus for concentrating trace amounts of components in a gaseous stream comprising: a chromatographic separation column with a first conduit means connected to one end and a second conduit means connected to the other end, a third conduit means connected to said first and second conduit means by first and second valve means, said third conduit means also containing a third valve means, a sample introduction means connected to said third valve means, a fourth conduit means connecting said first valve means with a detector means, a vent means connected to said second valve means, a fourth valve means connecting said second conduit means between said second valve means and said column, a displacer gas introduction means connected to said fourth valve means.

7. Apparatus for analyzing components in a gaseous stream comprising: a displacer gas variable flow device;

means for introducing displacer gas into said displacer gas variable flow device; a carrier gas variable flow device; means for introducing carrier gas into said carrier gas variable flow device; sample chromatographic column means; reference chromatographic column means; conduit means connecting said displacer gas variable flow device with said sample and reference chromatographic column means; conduit means connecting said carrier gas variable flow device with said sample and reference chromatographic column means having means operatively attached thereto for introducing sample into the carrier gas stream to said sample chromatographic column; detector means associated with said reference and said sample chromatographic column means.

References Cited

UNITED STATES PATENTS

| | | | |
|---|---|---|---|
| 3,030,798 | 4/1962 | Lichtenfels | 55—197 X |
| 3,140,598 | 7/1964 | Dunham | 73—23.1 |
| 3,232,093 | 2/1966 | Burow et al. | 73—23.1 |
| 3,247,702 | 4/1966 | Houser et al. | 73—23.1 X |

OTHER REFERENCES

"Gas-Liquid Chromatography," Richard S. Juvet et al., Interscience Publishers, New York–London, 1962, QD 271 D3, pp. 10–13.

REUBEN FRIEDMAN, Primary Examiner

J. L. DE CESARE, Assistant Examiner